(12) United States Patent
Weichholdt

(10) Patent No.: US 7,051,503 B2
(45) Date of Patent: May 30, 2006

(54) CROP DIVIDER

(75) Inventor: Dirk Weichholdt, Sarreguemines (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/767,140

(22) Filed: Jan. 29, 2004

(65) Prior Publication Data

US 2004/0244352 A1 Dec. 9, 2004

(30) Foreign Application Priority Data

Feb. 1, 2003 (DE) .............................. 103 03 990

(51) Int. Cl.
*A01D 57/01* (2006.01)
(52) U.S. Cl. .............................. 56/119; 56/314; 56/219
(58) Field of Classification Search .................. 56/119, 56/219, 312, 313
See application file for complete search history.

(56) References Cited

U.S. PATENT DOCUMENTS

| 57,656 | A | * | 9/1866 | Alden | 403/93 |
| 703,497 | A | * | 7/1902 | Steward | 56/319 |
| 1,788,102 | A | * | 1/1931 | Gilbert | 403/100 |
| 1,859,208 | A | * | 5/1932 | Kane | 56/319 |
| 2,209,047 | A | * | 7/1940 | Berg et al. | 56/319 |
| 2,629,465 | A | * | 2/1953 | Rhea | 403/100 |
| 2,895,757 | A | * | 7/1959 | Kaspar | 403/100 |
| 3,563,592 | A | * | 2/1971 | Preston | 292/263 |
| 4,087,954 | A | * | 5/1978 | Reese, Sr. | 56/119 |
| 4,296,593 | A | * | 10/1981 | Webb et al. | 56/98 |
| 4,917,322 | A | * | 4/1990 | Combs | 242/557 |
| 6,715,273 | B1 | * | 4/2004 | Weichholdt | 56/314 |

FOREIGN PATENT DOCUMENTS

| DE | 210229 | 5/1909 |
| DE | 416925 | 8/1925 |
| DE | 11 02 352 B | 3/1961 |
| DE | 19 06 150 A | 12/1969 |
| DE | 1926441 | 11/1970 |
| DE | 24 54 479 A | 5/1976 |
| DE | 128878 | 12/1977 |
| DE | 101 46 768 A1 | 4/2003 |
| EP | 0 539 745 A | 5/1993 |
| EP | 1 295 523 A | 3/2003 |
| FR | 1400384 | 4/1965 |
| FR | 2 068 083 A | 8/1971 |
| GB | 1 279 188 A | 6/1972 |

* cited by examiner

*Primary Examiner*—Meredith C. Petravick

(57) ABSTRACT

A crop divider for a harvesting assembly is provided with a foldable deflector. The deflector is mounted to the harvesting assembly by a pivot link having a pivot axis. The deflector can be folded about the pivot axis between an operating position and a transport position. The crop divider can be fixed in the operative position by an arresting element. In the operating position the arresting element surrounds the pivot link and locks the pivot link in place.

4 Claims, 3 Drawing Sheets

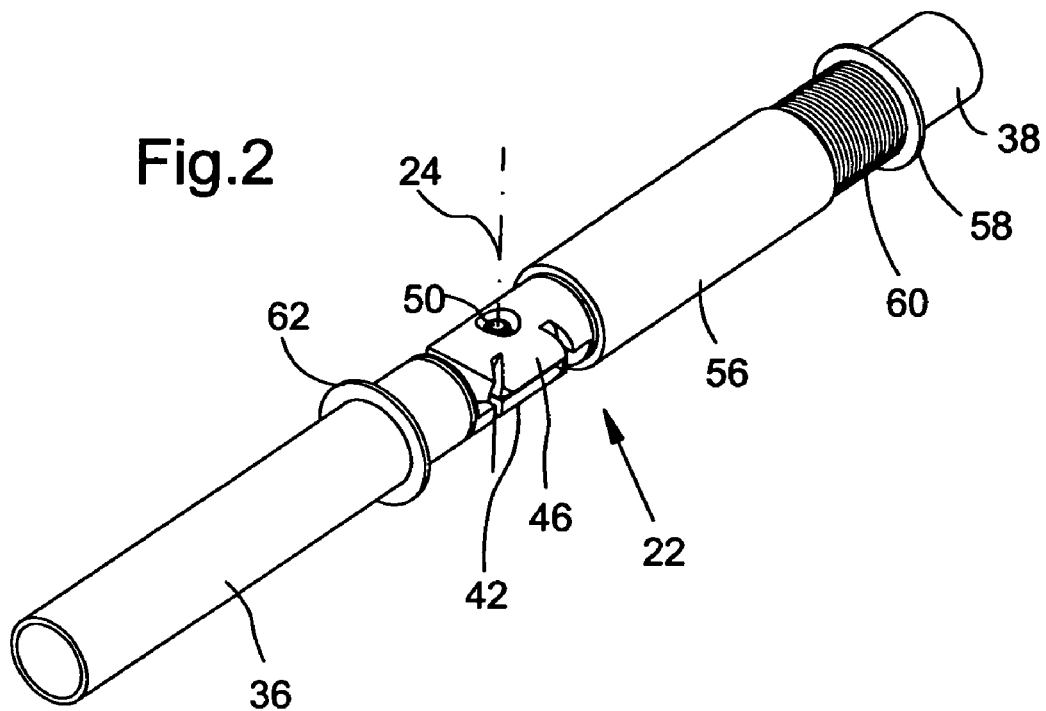
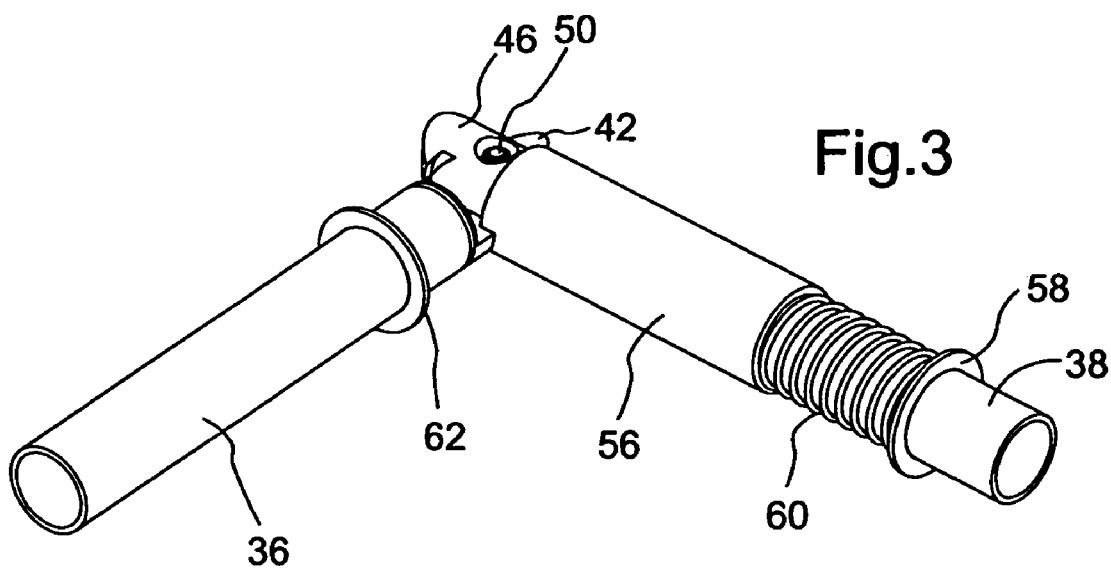

CROP DIVIDER

FIELD OF THE INVENTION

The present invention is directed to a crop divider for a harvesting assembly, having a deflector, which can be folded between an operating position and a transport position and locked in place by an arresting element.

BACKGROUND OF THE INVENTION

In DE 1 926 441 A, a crop divider is described, which is mounted so that it can pivot on a cutting unit by means of a pivot link. For fixing the divider in place, a spring tensioned wedge is pushed between the cutting unit fixed part and the pivoting part of the crop divider carrier tube. For another embodiment, the wedge is pushed on the bracket side of the pivot link.

DD 128 878 A shows another crop divider. It is fixed in its operative position at a distance from the pivot link by a sleeve, which is pushed onto a stationary pin.

DE 101 46 768 A, which was published later, proposes a crop divider, which is mounted on the cutting unit of a combine by means of a pivoting pivot link. A movable stop element, which is mounted within a tube holding the crop divider and which is pressed by spring force into a locking recess in the part of the crop divider that can pivot relative to the movable element, is used for fixing. In the tube, there is a slot through which the locking element extends, so that it can be pulled from the locking recess by hand against the force of the spring in order to be able to pivot the crop divider.

Thus, it is known in the state of the art to fix the crop divider by elements, which project out over the crop divider tube. Crop stalks can become entangled in these elements extending to the side, which can lead to blockage. If blockage occurs, it leads to so called pushing of the cutting unit, which means that the crop divider no longer fulfills its function, but instead only pushes the crops downward and/or forward, resulting in losses. Only DE 101 46 768 A discloses a pivot link with a relatively narrow profile. There, however, the moving parts of the pivot link are essentially exposed, so that crops can also collect there.

SUMMARY OF THE INVENTION

It is an object of the present invention to provide an improved pivoting crop divider, on which as few crop stalks as possible can become entangled.

A deflector of a crop divider can be connected to a harvesting assembly by a carrier having a pivot link. The pivot link enables the deflector to pivot about a pivot axis between an operating position, in which it usually extends in the direction of forward motion, and a transport position, in which the deflector is pivoted inwards, especially at the sides. It is proposed that an arresting element enclose the pivot link on both sides of the pivot axis of the pivot link in order to lock the pivot link in the operating position. In its locked position, the arresting element surrounds the pivot link completely or at least so far that the pivot link can no longer move. Parts of the arresting element are thus arranged on each side of the pivot axis. The parts arranged on the inside (with reference to the pivoting motion) prevent pivoting of the pivot link, while parts on the outside hold the arresting element in place and position.

In this way, an optimum locking of the pivot link is achieved, because pivoting about the pivot axis is enclosed by the arresting element protecting the pivot link from contaminants.

Various embodiments of the arresting element are conceivable. In its fixed position, only the pivot link and possibly also the carrier could be enclosed on only one side of the pivot link. This arrangement provides good protection for the pivot link. For another embodiment, in the fixed position, the pivot link encloses (in addition to the pivot link or, e.g., for material savings, exclusively) the carrier on both sides of the pivot link. Due to the greater effective length of the arresting element, the resulting longer lever arm, and the resulting better holding effect, an embodiment enclosing the carrier on both sides of the pivot link is preferred.

By displacement along the carrier, the arresting element can be brought into a position in which pivoting of the pivot link is possible. It would also be conceivable for there to be an arresting element, which can be removed for moving the pivot link and which is assembled from two or more parts, which can be separated from each other for removal or can be pivoted away from each other.

In the illustrated embodiment the arresting element is biased into its locking position by a spring. The spring then presses the arresting element against a holding element. However, it would also be conceivable to use the force of gravity or a splint to fix the arresting element in the fixed position.

It has proven to be meaningful to also fix the pivot link in the transport position. For this purpose, a part of the pivot link, which can pivot relative to the arresting element, can be provided with a groove or recess, into which the arresting element extends in the transport position in order to fix the pivot link.

The crop divider according to the invention can be used on all types of harvesting assemblies, such as headers, corn harvesters, or pickers. The harvest collecting header can be used especially on harvesting machines, such as combines and field choppers. The pivot link with the arresting element can also be supplied as a separate element and can be mounted on separate or already existing crop dividers.

BRIEF DESCRIPTION OF THE DRAWINGS

FIG. 2 is a perspective view of the pivot link with a locking element brought into an unlocked position.

FIG. 3 is a perspective view of the pivot link in the transport position.

DETAILED DESCRIPTION

Figure 1:
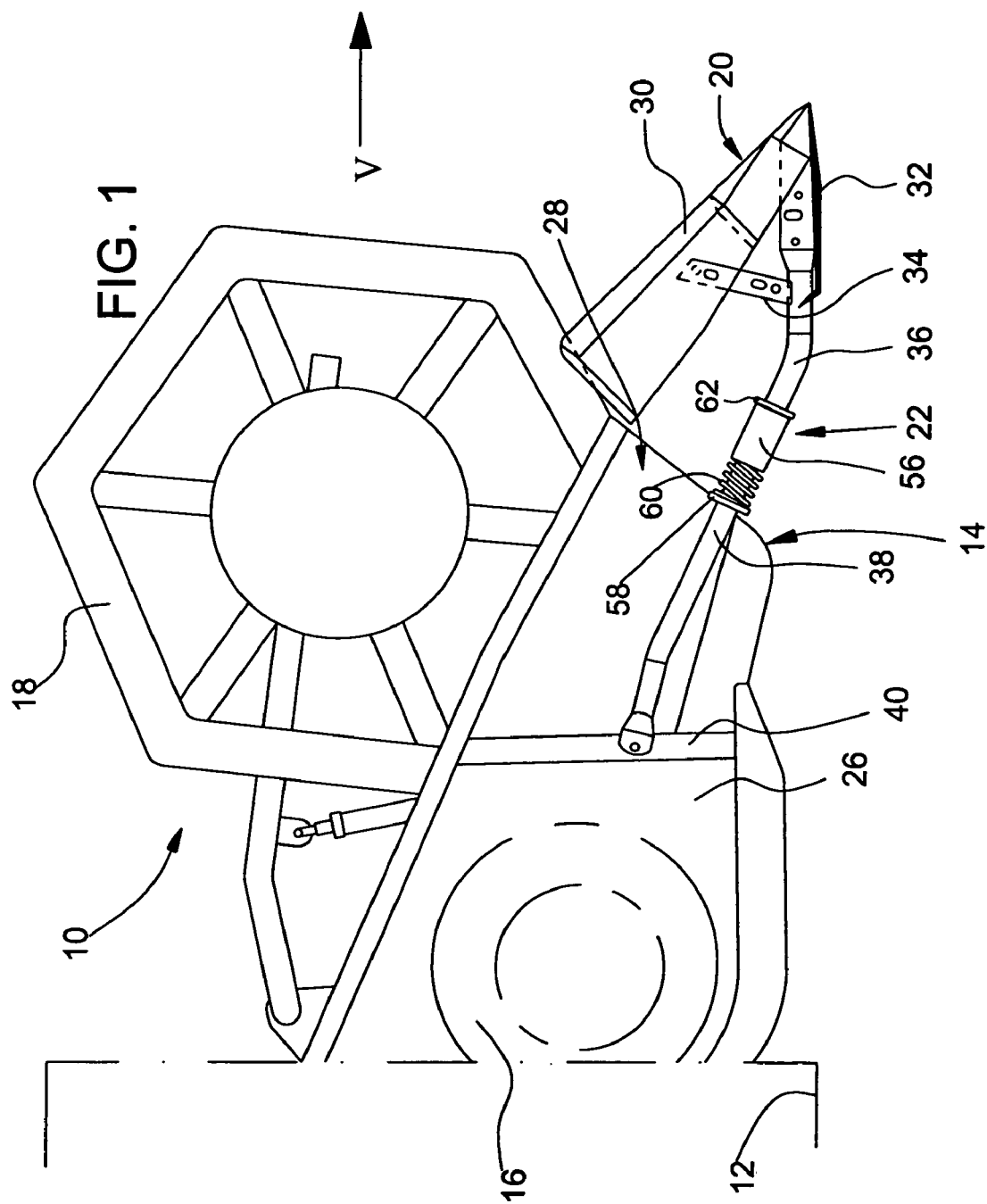
FIG. 1 is a side view of a crop harvesting device for a combine with a crop divider in the operative position.
Figure 4:
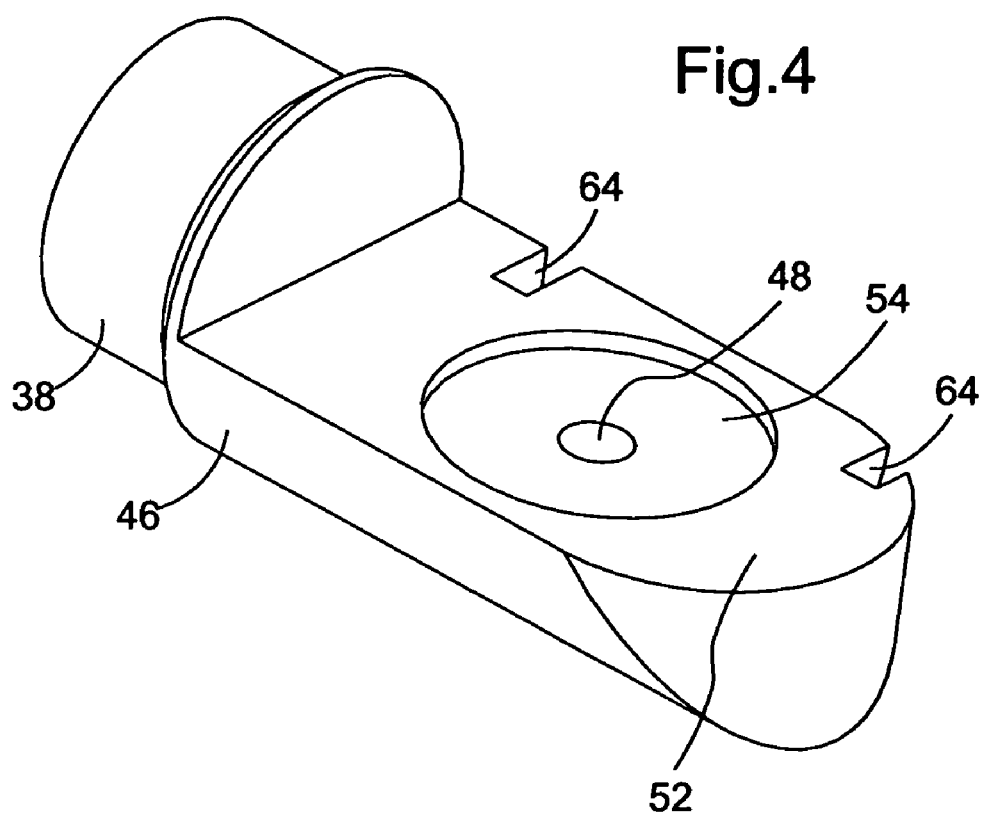
FIG. 4 is a perspective view of a bearing half of the pivot link from below.

In FIG. 1, a harvesting assembly 10 in the form of a harvesting platform is illustrated for use with a combine, that is not shown. This harvesting assembly 10 can be mounted on the front side of the schematically drawn feeder house 12. The harvesting assembly 10 features a cutting device 14, which is formed from a reaping table and a reciprocating cutter bar. In the illustrated embodiment a feeding conveyor 16, in the form of a transverse auger, concentrates the harvested crop material harvested by the cutting device and directs the crop material to the feeder house 12. A reel 18 located above the cutting device 14 gathers the standing crop against the cutting device 14 and propels the harvested crop rearwardly to the feeding conveyor 16. The reel 18 may be provided with crop engaging fingers. A lateral crop divider 20, which points in the forward direction V in its operative position extends forward from the harvesting assembly 10. The lateral crop divider 20 is mounted to the harvesting assembly 10 and is located in front of the cutting device 14. Usually, two symmetrical crop dividers 20 are arranged on both sides of the harvesting assembly 10. Both sides of the harvesting assembly 10 are also provided with side walls 26, which have approximately triangular front regions with tips 28. It should be noted that in the following, directional indications, such as in front of, behind, over, under, at the side, etc., refer to the direction V of forward motion.

The crop divider 20 is assembled from a deflector 30, a base plate 32, a support 34, and a first tube 36, which is attached by means of a pivot link 22 to a second tube 38, which is attached on its side to a brace 40, which is attached to the side wall 26 of the harvesting assembly 10. The tubes 36 and 38 are used as carriers for the deflector 30. The shell like deflector 30 with a cross section in the shape of a inverted U is fixed relative to the first tube 36 by the support 34 in its position pointing diagonally upwards and rearwardly from the direction V. The support 34 is welded onto the first tube 36. In addition, the base plate 32 (designed for sliding on the ground) is attached to the pressed flat front side of the first tube 36. The crop divider 20 is used for separating a track of harvested material from the adjacent, not yet harvested track. Thus, the deflector 30 is shaped to a point in its front region in the direction V of forward motion.

Figure 5:
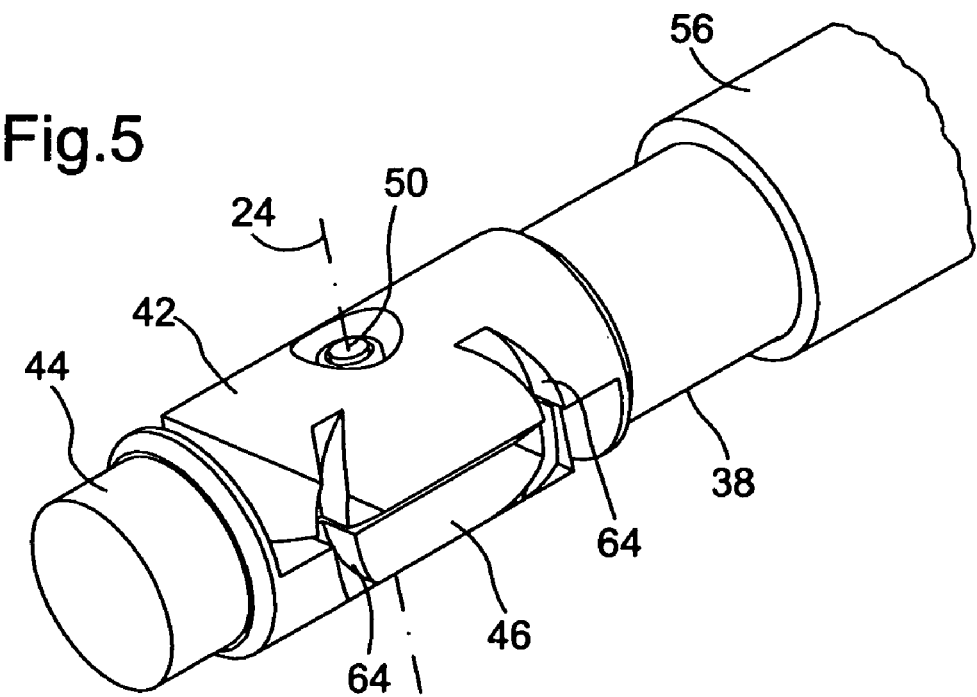
FIG. 5 is an enlarged view of the assembled bearing halves of the pivot link from below.

The first tube 36 is illustrated in FIGS. 1, 2, and 5 in the crop divider's operative position and in FIG. 3, in the crop divider's transport position. In the crop divider's transport position the deflector 30 is folded inwardly relative to the harvesting assembly 10. The deflector is folded by the pivot link 22 about a pivot axis 24 approximately ninety degrees. The pivot axis 24 of the pivot link 22 is not exactly vertical, instead, as can be seen in FIG. 1, it is inclined forward (in the counterclockwise direction with reference to the drawings) relative to the vertical in the direction V of forward motion. In the lateral direction, the pivot axis 24 is considered perpendicular, although it can also be inclined towards the sides.

The configuration of the pivot link 22 is shown in more detail in FIGS. 2 and 5. The pivot link 22 includes a first bearing half 42, which is connected to the first tube 36. For this purpose, a cylindrical projection 44 is used, which is pushed in the axial direction into the first tube 36 and which is mounted so that it can or cannot be detached, e.g., by a screw, rivet, solder, adhesive, weld, and/or shrink on connection. The pivot link 22 further includes a second bearing half 46, which likewise has a projection, which cannot be seen in the figures because it is pushed into the second tube 38 and which is connected to the second tube 38 analogous to the attachment of the projection 44 in the first tube 36.

The bearing halves 42 and 46 are arranged mirror each other and are inverted relative to each other, but are formed identically. Each of the bearing halves 42 and 46 are semi-cylindrical and have adjoining flat surfaces 52. A centering hole 48 defining the pivot axis 24 passes through each bearing half 42 and 46. A mounting bolt 50 extends through holes 48, which is secured by a nut. Alternatively, a rivet could also be used. The flat surfaces 52 of the bearing halves 42 and 46 coming into contact with each other, and are provided with a circular recess 54 in the area of the hole 48, which is used for receiving a plain washer. The plain washer advantageously consists of a material with a low coefficient of friction, such as Teflon, and makes the pivoting easier. The screw 50 and the shape of the bearing halves 42 and 46 enable a pivoting of the first bearing half 42 about the pivot axis 24.

For fixing the pivot link 22 in the operative position (FIGS. 1, 2, and 5), as well as in the transport position (FIG. 3), a hollow cylinder arresting element 56 is used. The hollow cylinder arresting element 56 is slidably received on the second tube 38 so that it can move along the tube 38. A helical biasing spring 60 is position between the end of the arresting element 56 removed from the pivot axis 24 and a first ring 58. The first ring 58 extends like a collar from the second tube 38 and is connected to the second tube 38. The helical spring 60 biases the arresting element 56 towards the pivot axis 24. In this way, the arresting element 56 slides into the operative position over the two bearing halves 42 and 46 and comes to contact a second ring 62 used as a stop element. The second ring 62 is affixed to and extends from the first tube 36 like a collar. Because the arresting element 56 extends over both tubes 36 and 38, the crop divider 20 can complete almost no undesired lateral or vertical movements during harvesting operation despite the rather simple bearing in the pivot link 22. In addition, the arresting element 56 protects the bearing halves 42 and 46 from contamination due to harvesting material. Almost no harvesting material can become entangled due to the profile of the arresting element 56, which projects very slightly over the tubes 36 and 38.

The arresting element 56 can be moved against the force of the spring 60 by hand in the direction towards the first ring 58. As soon as the arresting element 56 has been pulled from the first bearing half 42, the latter is thus exposed; the crop divider 20 can be folded about the pivot axis 24. As soon as it is guided into its transport position, the operator can let go of the arresting element 56. It is then moved by the force of the spring 60 in the direction towards the second bearing half 46, where the front side of the arresting element 56 penetrates into recesses 64 in the side surfaces of the second bearing half 46 facing the arresting element. Because the arresting element 56 is pressed by the spring 60 into the recesses 64, the pivot link 22 is also fixed in the transport position. In general, the operator can also let go of the arresting element 56 when the pivot link 22 is rotated about an angle of approximately 45° from the operative position into the transport position, because then the front side of the arresting element 56 slides on the surface of the second bearing half 46 facing the arresting element.

The movement from the transport position into the operative position is performed analogously, in that the arresting element 56 is pulled from the recesses 64 by hand, the crop divider 20 is pivoted about the pivot axis 24, and the arresting element 56 is pulled by hand and/or by the force of the spring 60 over the bearing halves 42 and 46. It would also be conceivable to fix the arresting element 56 in a position enabling the pivoting of the crop divider 24, e.g., by a pin, which is inserted in corresponding openings in the arresting element 56 and in the second tube 38.

In addition, the second tube 38 could also be connected to the crop divider 20, while the first tube 36 is attached to the harvesting assembly 10.

As a result, one obtains a pivot link 22 for a crop divider 20, which is distinguished by compactness, secure fixing, and long service life due to the protective effect of the arresting element 56.

Having described the illustrated embodiment, it will become apparent that various modifications can be made without departing from the scope of the invention as defined in the accompanying claims.

The invention claimed is:

1. A crop divider for a harvesting assembly, the crop divider provided with a deflector, the deflector mounted to the harvesting assembly by a pivot link having a pivot axis, the deflector capable of being pivoted about the pivot axis into a transport position and an operating position, wherein an arresting element locks the pivot link in the transport position, the arresting element biased by a spring into the locking position, the deflector capable of being locked into the operating position by the arresting element, wherein the pivot link is mounted between a first tube and a second tube and the arresting element is a hollow cylinder slidably positioned to slide on one of the first and second tubes so that when the arresting element is in the locking position for the operating position of the deflector, the arresting element encloses and locks the pivot link on both sides of the pivot axis.

2. A crop divider for a harvesting assembly, the crop divider provided with a deflector, the deflector mounted to the harvesting assembly by a pivot link having a pivot axis, the deflector capable of being pivoted about the pivot axis into a transport position and an operating position, wherein an arresting element locks the pivot link in the transport position, the arresting element biased by a spring into the locking position, the deflector capable of being locked into the operating position by the arresting element, wherein the pivot link is mounted between a first tube and a second tube and the arresting element is a hollow cylinder slidably positioned to slide on one of the first and second tubes so that when the arresting element is in the locking position for the operating position of the deflector, the arresting element encloses and locks the pivot link on both sides of the pivot axis, and wherein a part of the pivot link, which can move relative to the arresting element, is provided with a recess, in which the arresting element extends in the transport position locking the pivot link.

3. A crop divider for a harvesting assembly, the crop divider provided with a deflector mounted to the harvesting assembly by a pivot link having a pivot axis, the deflector capable of being pivoted about the pivot axis into a transport position and an operating position, the deflector locked into the operating position by an arresting element having a locking position, wherein the pivot link is mounted between a first tube and a second tube and the arresting element is a hollow cylinder slidably positioned to slide on one of the first and second tubes, to lock the pivot link in the transport position or the operating position, such that when the arresting element is in the locking position for the operating position of the deflector, the arresting element encloses and locks the pivot link on both sides of the pivot axis.

4. A crop divider for a harvesting assembly, the crop divider provided with a deflector mounted to the harvesting assembly by a pivot link having a pivot axis, the pivot link being mounted between a first tube and a second tube of an arresting element, the arresting element being a hollow cylinder slidably posiionted to slide on one of the first or second tubes, the deflector capable of being pivoted about the pivot axis into a transport position and an operating position, the deflector being locked into the operating position or transport position by the arresting element such that when the arresting element is in the locking position for the operating position of the deflector, the arresting element encloses and locks the pivot link on both sides of the pivot axis, and wherein a part of the pivot link, which can move relative to the arresting element, is provided with a recess in which the arresting element extends in the transport position, locking the pivot link.

* * * * *